United States Patent Office 2,803,547
Patented Aug. 20, 1957

2,803,547

MANUFACTURE OF EMULSION-TYPE SAUSAGES

Elmer F. Glabe, Chicago, Ill., assignor to the United States of America as represented by the Secretary of Agriculture No Drawing. Application June 7, 1955,
Serial No. 513,918

1 Claim. (Cl. 99—109)

This invention relates to the manufacture of emulsion-type sausages such as frankfurter sausages, Polish sausage, and Bologna. It relates more particularly to an emulsion-type sausage composition which possesses improved texture and general eating qualities, and possesses, moreover, a high stability against physical and structural deterioration.

This invention is related to the invention described and claimed in my application, Serial No. 382,492, filed August 11, 1953, and is an improvement thereover.

In my copending application referred to above, I have disclosed that the addition of "Gelsoy" to emulsion-type sausages results in improved texture, water retention, and stability of the sausages. The apparent action of Gelsoy is to stabilize or otherwise affect the emulsion character of the water and solids, permitting the latter to absorb and hold more water during the processing operations.

In this specification and claim, the term "Gelsoy" refers to a water-extractable proteinaceous material from oil-free soybean material that has been previously washed or extracted with a lower aliphatic alcohol, such as ethanol. Gelsoy and methods for producing it are described in U. S. Patent No. 2,495,706, granted to De Voss, Beckel, and Belter. Briefly stated, the product is prepared by treating a proteinaceous soybean material such as hexane-extracted soybean flakes with an alcohol, such as ethanol in a concentration of from about 50 percent to absolute. This is primarily a washing treatment to remove antigelling factors and other alcohol-soluble matter. The treated soybean material is then extracted with water, and the proteinaceous material recovered from the aqueous extract is Gelsoy.

Even though my prior invention results in an improved product, the use of an appreciable amount of Gelsoy is required. For example, best results are obtained, using 1 to 2 percent of Gelsoy based on the meat-fat formula used. This ingredient is relatively expensive and adds to the cost of the product.

I have now discovered that the amount of Gelsoy required in emulsion-type sausage formulae may be reduced to one-half or less than that required in my previous invention. This is achieved by adding a minor quantity of sodium hexametaphosphate. The ratio of this compound to Gelsoy is preferably about 1:3 to 1:10. The effect of the two ingredients is surprising, for the resulting sausage possesses an excellent texture and eating quality, the sausage after cooking has a full casing and a definitely juicy texture. There is no local separation of juices, when made according to this invention, and the flavor is excellent, the spices being well distributed throughout the meat. However, when the ingredients are employed singly in the same amount, or even in considerably higher amounts, the effects are only medium in degree.

In general, the procedure for the manufacture of the sausage as disclosed in my pending application is as follows:

The manufacture of emulsion-type sausages is a complex operation consisting of chemical reactions within the products which are not yet thoroughly understood. The emulsion involved is one which is greatly influenced by the degree and amount of mechanical chopping or agitation. It is common practice to add ice during the chopping operation to hold down the temperature which would normally rise due to the rapid action of the chopper. The ice, of course, is converted to water during the operation, and this water must be absorbed and held in suspension throughout the chopping, stuffing, smoking, cooking, and cooling steps as they may be involved in the process.

Many substances have been used heretofore to assist the absorption of water and to render the emulsion stable. These substances include cereals, starchy binders, powdered milk, soybean flour, and the like. The kinds and amounts of additives vary greatly with the particular manufacturing locality. In many important localities it is common practice to include rather large proportions of water, usually added as ice during the chopping operation.

In general, the method of manufacture may vary over wide limits to provide for the particular type of sausage desired, the individual recipe, and the like. The formulae in which this invention is most advantageous, however, are those which call for macerating a proportion of lean meat and a proportion of fat in the presence of added water, preferably added at least in part as ice. Seasoning such as salt, spices, sugar, and the like, as well as seasoning agents, may be present during maceration or may be added later.

It is convenient to add the Gelsoy-sodium hexametaphosphate together, preferably with a small amount of starch or dextrin. The purpose of the latter ingredient is to aid in dissemination and distribution during the subsequent operations. A typical mixture of the Gelsoy-phosphate additive contains 5 parts of Gelsoy, 4 parts of dextrin or starch, and 1 part sodium hexametaphosphate. The mixture may be added at any time during or before the maceration; i. e., in the grinding or chopping steps. For best results it should be added at such a time as to afford uniform distribution throughout the sausage mass. The maceration steps are then followed by a series of finishing operations which includes stuffing, smoking, and cooking. These latter steps may be carried out as is commonly done in this art.

As anyone skilled in the art will recognize, it is not necessary that the ingredients be added in any special admixture or in any special sequence. However, this invention will be described in detail employing a Gelsoy-phosphate mixture as above described, it being understood that the ingredients may be added separately.

According to the present invention, the Gelsoy-phosphate mixture may also be used in conjunction with either or both of the customary starchy or protein binders, as, for example, cereal or dried skim-milk powder. Its advantages over each are distinctive, however, for it possesses the water-holding properties of the former without reducing the protein content of the sausage, and it is superior in water-binding to the latter. It also provides a sausage with a firm texture without adversely affecting the flavor.

The beneficial effects of Gelsoy, according to this invention may be realized over the range of 0.1 to 1.0 percent based on the meat-fat formula, the corresponding range of phosphate being 0.02 to 0.2 percent. As the following specific examples will show, even in comparison with the invention of my copending application, this present invention permits a reduction in the amount of nonmeat ingredients. One of its most important commercial aspects is that it increases the yield of finished sausage.

EXAMPLE 1

A series of experimental batches of sausages were made as follows:

Preparation of meat materials

Chuck beef, pork loin, and pork fat were obtained from a local butcher. The beef and the pork were thoroughly trimmed, so that the lean meat contained no trimmable fat of any kind. The following composition was selected as a base for these tests, and 100 grams was used as a standard batch.

| | Percent |
|---|---|
| Lean beef | 36.7 |
| Lean pork | 18.3 |
| Pork fat | 45.0 |

To 100 grams of the above composition were added the following:

| | Grams |
|---|---|
| Salt | 2 |
| Potassium nitrate | 1.27 |
| Potassium nitrite | 0.127 |

No spice was added in order to make observation of flavor differences caused by the additive more outstanding.

The meat, previously cut into 1-inch pieces, was mixed by hand with the salt and potassium nitrate and potassium nitrite. The meat was then ground through a 3/16-inch die, and the resulting ground meat was stored at 40° F. for several hours. This coarsely ground combination is the basic mixture.

Chopping

Small batches of meat were selected for laboratory test operations because of the feasibility of obtaining more uniform raw materials prepared as above. Another feature is the uniformity of chopping operations. These were carried out in a Waring blendor, which has been found to give an action fairly comparable to an ordinary commercial silent cutter. The chopping requires about 3 minutes, but is carried to a point where the appearance of the batch indicates good emulsification of the fat and water. This is similar to the practice normally used in plant operations. Experience has shown that if the chopping in the Waring blendor is carried to the critical point, good differentiation in the separation of fat in various frankfurters can be observed. Ice water and other additives are placed in this Waring blendor, as is normally done commercially.

Stuffing

The sausage mix was stuffed into Visking casings by means of a hand-operated pressure cylinder. The casings are then tied off into conventional lengths.

Heat treatment in lieu of smoke house

Normally the sausages would be subjected to a smokehouse operation. For laboratory purposes, however, the sausages are subjected to similar temperature combinations, but without the presence of smoke. This is done in a thermostatically controlled oven held at the following temperatures:

135° F. for 30 minutes, raised to
150° F. for 30 minutes, raised to
165° F. for 60 minutes, raised to
180° F. until the interior temperature of the frankfurters reached 150° F., which should not take longer than 20 minutes.

Cooking

The frankfurters are removed from the heat chamber and plunged into water at 160° F. for 5 minutes.

Cooling

The frankfurters are then cooled under running tap water for about one-half hour. They are then hung in a refrigerator at 40° F. for approximately 16 hours, after which examination is made.

Water in the form of ice was added in the amount of 36 percent based on the meat-fat base during the chopping operation. In the control batch no further water or other additions were made. In the experimental batches, the indicated amounts of additional water were added. Transparent Visking casings were used. The finished sausages were examined and rated for fat separation. The results are shown in Table 1.

TABLE 1.—SAUSAGE EXPERIMENTS

| No. | | Added water, Percent | Fat separation | |
|---|---|---|---|---|
| | | | Experiment No. 1 | Experiment No. 2 |
| 1 | Control—no binder | | Excessive | Excessive. |
| 2 | Control—3% nonfat dry-milk solids. | 3 | Medium | Small amount. |
| 3 | 1.0% Gelsoy | 3 | Small amount. | Do. |
| 4 | 0.5% Gelsoy | 3 | Medium | Excessive. |
| 5 | 0.1% Sodium hexametaphosphate. | 3 | do | Do. |
| 6 | 0.4% Wheat dextrin | 3 | Excessive | Do. |
| 7 | 1.0% Gelsoy-phosphate mixture.[1] | 3 | Slight | Slight. |

| [1] | Percent |
|---|---|
| Gelsoy | 50 |
| Sodium hexametaphosphate | 10 |
| Dextrin | 40 |

EXAMPLE 2

A larger scale experiment was carried out as follows, using commercial sausage-making equipment for grinding and chopping. A Polish-sausage formula was made up as follows:

TABLE 2

| | Control, Pounds | Experimental run, Pounds |
|---|---|---|
| Lean beef | 15 | 15 |
| Lean pork | 40 | 40 |
| Pork trimming | 35 | 35 |
| Cheeks | 10 | 10 |
| Nonfat dry-milk solids | 6 | |
| 1.0% Gelsoy-phosphate[1] | | 3 |
| Ice | 20 | 20 |
| | 126 | 123 |

| [1] | Percent |
|---|---|
| Gelsoy | 50 |
| Sodium hexametaphosphate | 10 |
| Dextrin | 40 |

Results

The experimental run, as compared to the control, showed very good consistency in the chopper and stuffer. No difficulty was encountered in the smoke-house or cooling operation. There was no fat separation nor water pockets. The yield from the experimental batch was 118 pounds as against 108 pounds for the control, showing approximately a 10-percent increase in yield. General quality of the finished product was excellent.

Polish sausage is a typical cooked or emulsion-type sausage which is closely related to frankfurters and Bologna. Additional runs were made, using the formula above, over a period of 3 weeks. The total number of runs was 16. There was no substantial differences in any of the runs. Yields averaged about the same throughout.

EXAMPLE 3

This example illustrates the preparation of all-beef frankfurters. The beef used was in the estimated ratio of about 85:15 of lean to fat. A control run was made at the same time as the experimental run. The formulae are presented in Table 3.

TABLE 3

|  | Control, Pounds | Experimental run No. 17, Pounds |
|---|---|---|
| Beef (see above) | 75 | 75 |
| Nonfat dry-milk solids | 6 | |
| Gelsoy-phosphate mixture | | 3 |
| Ice | 25 | 25 |
|  | 106 | 103 |

The chopping, stuffing, smoking, cooking, and cooling operations were the same as in the preceding examples. There was no fat separation or water pockets observable, and the yield on the experimental run was about 5 percent higher than the controls. In addition to the above examples, similar runs were made on other all-beef frankfurters and on standard formulae of Thuringer and ring Bologna. The results were substantially similar to those of the foregoing examples.

I claim:

In a method of manufacturing emulsion-type sausages having as essential ingredients meat, seasoning and curing agents, and water, comprising macerating the meat ingredients in the presence of water, the improvement comprising incorporating with said ingredients during the maceration thereof 0.1 to 1.0 percent, based on the meat-fat formula, of a water-extractable proteinaceous material from oil-free soybean material that has been previously extracted with a lower aliphatic alcohol and from 0.02 to 0.2 percent on the same basis of sodium hexametaphosphate.

References Cited in the file of this patent

UNITED STATES PATENTS

| 2,035,136 | Levinson et al. | Mar. 24, 1936 |
| 2,060,160 | Allen | Nov. 10, 1936 |
| 2,355,548 | Musher | Aug. 8, 194_ |
| 2,495,706 | De Voss et al. | Jan. 31, 1950 |
| 2,634,212 | Komarik | Apr. 7, 1953 |
| 2,635,963 | Glabe | Apr. 21, 1953 |